3 Sheets—Sheet 3.
G. GOWAN & A. WILLIAMS.
Reciprocating Saw Mill.
No. 241,857. Patented May 24, 1881.
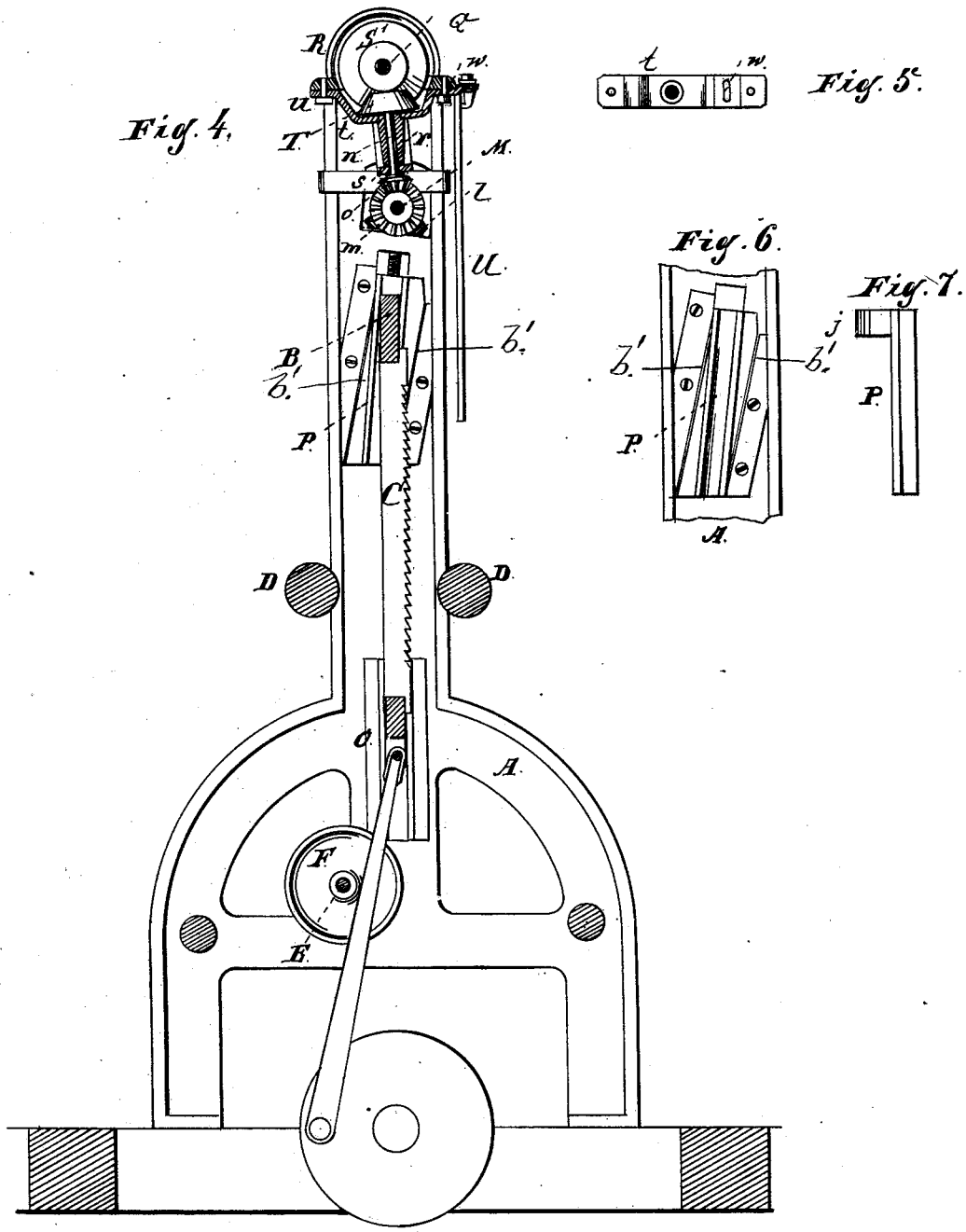
Witnesses:
H. F. Bruns.
O. W. Bond.
Inventors:
George Gowan
Alfred Williams
By West & Bond Attys

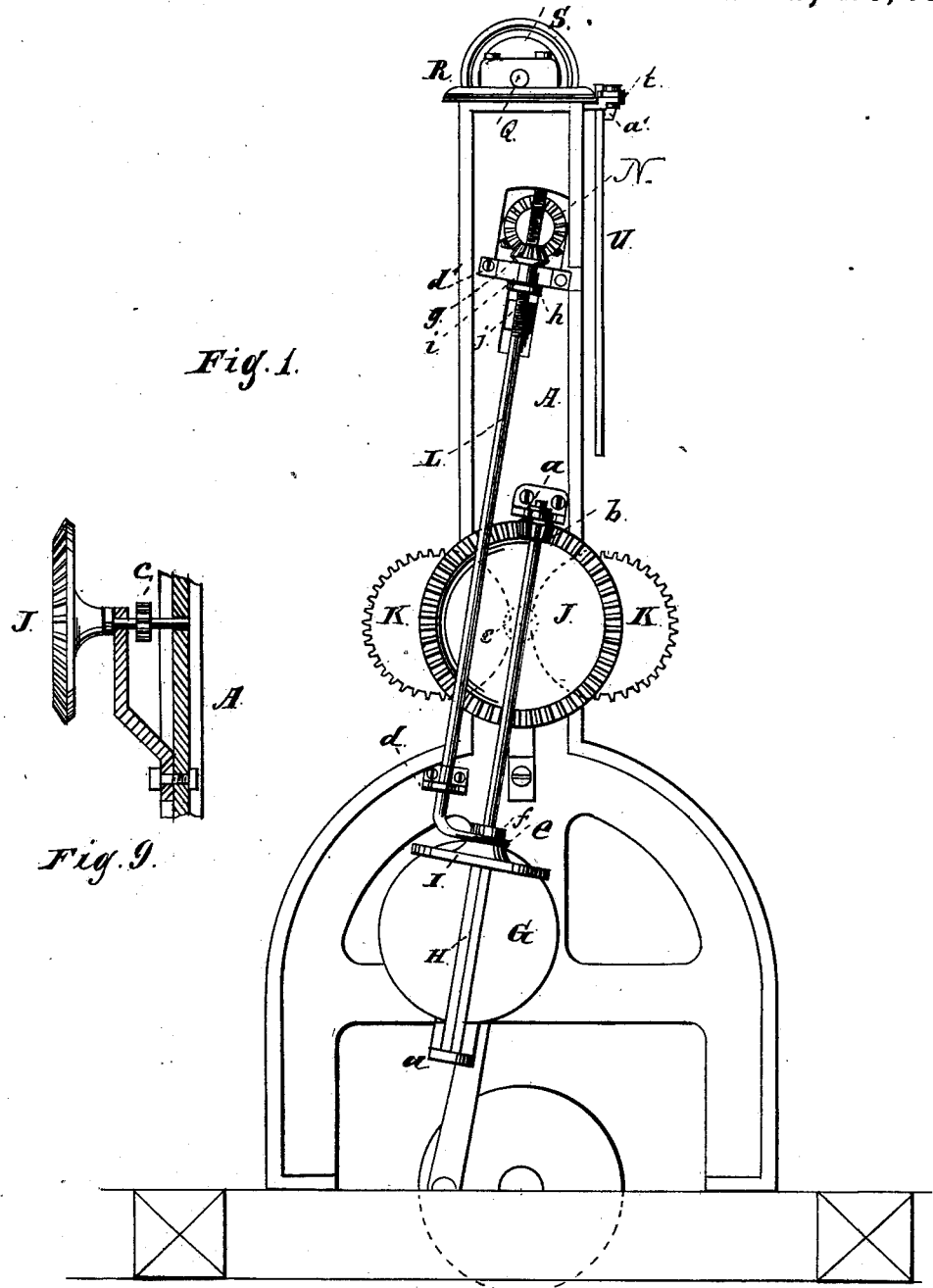

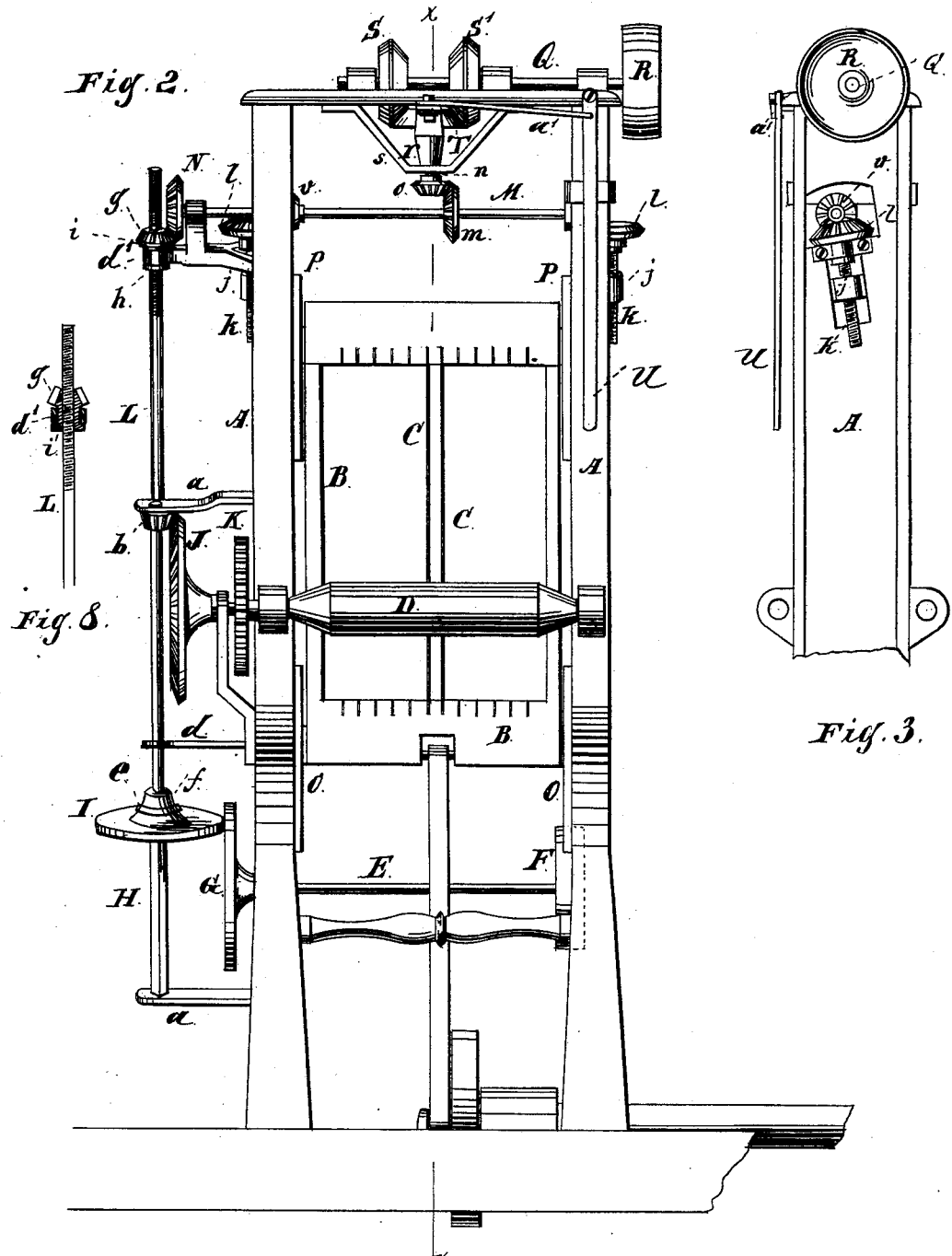

UNITED STATES PATENT OFFICE.

GEORGE GOWAN, OF ROCK ISLAND, AND ALFRED WILLIAMS, OF MOLINE, ILLINOIS.

RECIPROCATING-SAW MILL.

SPECIFICATION forming part of Letters Patent No. 241,857, dated May 24, 1881.

Application filed January 10, 1880.

*To all whom it may concern:*

Be it known that we, GEORGE GOWAN, of Rock Island, and ALFRED WILLIAMS, of Moline, in the county of Rock Island and State of Illinois, and citizens of the United States, have invented a new and useful Improvement in Reciprocating-Saw Mills, of which the following is a full description, reference being had to the accompanying drawings, in which—

Figure 1 is a side elevation. Fig. 2 is a front elevation. Fig. 3 is a detail, being a side elevation of the parts represented. Fig. 4 is a vertical section at $x$ of Fig. 2, looking to the right. Figs. 5, 6, 7, and 8 are details. Fig. 9 is also a detail.

This improvement relates to saw-mills in which the saws have a reciprocating motion, and is especially designed for gang-mills. It is customary to arrange the saws so that their upper ends will overhang the lower ends a little, giving the saws more or less "rake." It is also necessary to vary the feed, not only for different logs, but for different parts of the same log, and the rake of the saws ought to vary with the feed.

In the drawings, A represents the main frame, which is constructed in any suitable manner.

B is the saw-gate.

C are saws. Two only are shown, but any suitable number may be used.

D are feed-rollers supported in bearings in the frame A.

E is a shaft supported in bearings in the frame A. This shaft is driven by a pulley, F.

G is a metal disk on one end of the shaft E, having a smooth outer surface.

H is a vertical shaft, the lower end of which is square. It is supported in bearings $a$.

I is a disk of metal fitted loosely on the square portion of the shaft H. It has a smooth periphery, and is so arranged that such periphery comes in contact with the surface of the disk G.

$b$ is a bevel-pinion upon the upper end of the shaft H. It engages with the bevel-gear wheel J, which is on a short shaft supported in its bearings. On the inner end of this short shaft is a pinion, $c$, which engages with the gear-wheels K, which drive the feed-rollers D, to which they are respectively connected.

L is a rod, which moves up and down in the guides or bearings $d$ $d'$. The lower end is bent at right angles with the main portion, and flattened and provided with a hole, through which the shaft H passes. This flattened end $e$ is located between the disk I and a collar, $f$, secured to the shaft H, so that the disk I will be moved up and down on the shaft H as the rod L moves up or down. The upper end of the rod L is screw-threaded, and upon it is a bevel-pinion, $g$, the interior of which has a screw-thread fitting the thread on the rod L. To the under side of this pinion is secured a sleeve, $i$, which passes through the bearing $d'$, and on the lower end of such sleeve is a collar, $h$.

M is a shaft in suitable bearings. On one end of this shaft is a bevel-wheel, N, which engages with the pinion $g$.

O O are the two lower guides for the saw-gate, and P P are the two upper guides. These two upper guides can be moved up or down in guideways $b'$, which are somewhat diagonal to the uprights to which they are secured, the sides of the guide-blocks having a corresponding form, and thus the rake of the saws can be adjusted. Upon each of the upper guide-plates is an eye, $j$, which projects through the upright of the frame, a suitable slot being provided, and the eye is screw-threaded.

$k$ is a screw fitting the screw-threaded eye $j$. On the upper end of each of these screws $k$ is a bevel-wheel, $l$. On the shaft M are two small bevel-wheels, $v$, each of which engages with one of the wheels $l$.

$m$ is another bevel-wheel on the shaft M.

Q is another shaft, running in suitable bearings, and driven by a pulley, R.

S S' are two bevel friction-wheels on the shaft Q.

T is another bevel friction-wheel, located between the two wheels S S', and so arranged that it can be brought into contact with either one of them at pleasure, or can be free from both of them. This wheel T is supported on a short shaft, $n$, which passes through a sleeve, $r$, the lower end of which is supported on the hanger $s$, through which the shaft $n$ passes. On the lower end of this shaft $n$ is a bevel-wheel, $o$, which engages with the wheel $m$.

$t$ is a short bar, bent as shown, one end of which is pivoted to the top of the frame at u. The other end is loosely held by a bolt which passes through a slot, w, in t, so that this end of the bar t can be moved a little either to the right or left. The upper end of the sleeve r is secured to this bar t.

U is a lever, by means of which the free end of the bar t can be moved. This lever, as shown, is pivoted at its upper end to the frame, and is connected with the bar t by a rod, a'.

The shafts E and Q may be driven by belts which are not shown.

The operation is as follows: When the shaft E is in motion the disk G will revolve, and, its face being in contact with the periphery of the disk I, motion will be communicated to I, causing the shaft H to revolve, and through the pinion b, wheel J, pinion c, and wheels K K motion will be given to the feed-rollers D D. The speed of these feed-rollers can be increased or diminished by raising or lowering the disk I, which can be done by raising or lowering the rod L, and this is accomplished by the wheels N g and the rotation of the shaft M.

The rake of the saws can be adjusted by raising or lowering the guides P P, and this can be done by causing the shaft M to rotate, when the action of the wheels v and l, with the screw k, will raise or lower these guides.

It will be perceived that when the shaft M rotates in one direction the disk I will be raised, thus increasing the feed, and at the same time the guides P P will be raised, giving the saws more rake; and when this shaft M rotates in the opposite direction the disk I and the guides P P will be simultaneously lowered, decreasing the feed, and at the same time giving the saws less rake.

The shaft M is driven by the pinion o and wheel m, the shaft upon which the pinion o is located being driven by the wheel T when the same is in contact with one of the wheels, S or S'. Of course T and M move in one direction when T is in contact with S, and in the opposite direction when it is in contact with S'; and it is brought into contact with either one of these wheels S S' by means of the lever U moving the bar t to the left or right. When this lever is in the position shown in Fig. 2 the wheel T will not be in contact with either of the wheels S S', and the shaft M will not be in motion.

We do not limit ourselves to the arrangement of the upper guides and guideways shown and described. These guides might be arranged at a different angle, or they might be made to move at right angles across the uprights in which they are placed. We think that the arrangement shown is the most convenient.

It is evident that the same movement might be applied to the lower guides instead of to the upper guides, for the purpose of adjusting the rake of the saws with the feed; but in practice it will, we now believe, be more convenient to make the application to the upper guides.

Heretofore guides provided with inclined channels in which the saw-gate or cross-head reciprocates have been adjustably secured to the frame of the machine by slots and bolts and nuts, whereby the rake of the saw could be changed, but such does not constitute our invention; and heretofore the upper end of a saw has been attached to a box sliding on a vertical rod arranged parallel to the frame of the machine, said rod being connected with a system of shafts, pinions, and screws operated by the attendant so that the vertical rod could be adjusted outward and inward in a plane parallel to the frame of the machine for adjusting the overhang of the saws; but such does not constitute our invention.

What we claim as new, and desire to secure by Letters Patent, is as follows:

1. The combination of the shaft M, having the bevel-wheels v v and N, with the screws k, having bevel-cog wheels l, and with the vertical rod L, screw-pinion g, and disk I, for raising and lowering the gate-guides simultaneously with the disk I, substantially as and for the purposes set forth.

2. In a saw-mill, the frame A, having the inclined guideways b' and the guides P, forming bearings for the reciprocating saw-gate, and provided with projecting threaded eyes j, in combination with the screws k passing through said eyes, and having bevel-wheels l, the horizontal shaft M, provided with the central bevel-wheel, m, and end bevel-wheels, v v, the bevel-wheel o, a shaft, Q, arranged to continuously revolve in one direction, and intermediate connecting devices between the continuously-revolving shaft and the bevel-wheel o, substantially as described, for imparting motion to the latter in reverse directions at will, for automatically adjusting the guides in their inclined guideways, as set forth.

GEORGE GOWAN.
ALFRED WILLIAMS.

Witnesses:
WALTER J. ENTRIKIN,
E. W. OSBORN.